United States Patent [19]

Hu et al.

[11] Patent Number: 5,385,753
[45] Date of Patent: Jan. 31, 1995

[54] PROCESS FOR REACTIVELY COATING PARTICLES

[75] Inventors: Patrick C. Hu, Baton Rouge, La.; Richard I. Leavitt, Ponte Vedra Beach, Fla.

[73] Assignee: Albemarle Corporation, Richmond, Va.

[21] Appl. No.: 114,028

[22] Filed: Aug. 30, 1993

[51] Int. Cl.⁶ .............................................. B05D 7/00
[52] U.S. Cl. .................................... 427/215; 427/218; 427/226; 427/399; 502/60; 502/64; 502/67; 106/437; 106/442; 106/467
[58] Field of Search ............. 427/215, 218, 226, 399; 502/60, 64, 67; 106/437, 442, 467

[56] References Cited

U.S. PATENT DOCUMENTS

| | | | |
|---|---|---|---|
| 4,220,567 | 9/1980 | Kindervater et al. | 260/22 A |
| 4,435,220 | 3/1984 | Watanabe et al. | 106/467 |
| 4,752,341 | 6/1988 | Rock | 106/300 |
| 4,874,433 | 10/1989 | Kiss et al. | 106/450 |

OTHER PUBLICATIONS

"Cyanide Photo-oxidation Using a $TiO_2$-coated Zeolite", Domènech et al., Chem Ind., vol. 18, p. 606, 1989 no month.

*Primary Examiner*—Shrive Beck
*Assistant Examiner*—David M. Maiorana
*Attorney, Agent, or Firm*—Richard J. Hammond

[57] ABSTRACT

Coated particles having properties such as to make them suitable as replacements for titanium dioxide particles can be obtained by reacting a titanium or zirconium halide, ether, or ester with zeolite hydrate particles so as to coat the zeolite particles with titania or zirconia. The reaction is preferably conducted between a titanium compound, such as titanium tetrachloride, and the zeolite in an inert medium, such as anhydrous or substantially anhydrous air or a hydrocarbon.

17 Claims, No Drawings

PROCESS FOR REACTIVELY COATING PARTICLES

FIELD OF INVENTION

This invention relates to coated particles, such as $TiO_2$-coated zeolite particles, and more particularly to a process for preparing them.

BACKGROUND

Titanium dioxide is a substance which is widely used as a paper filler, or pigment, and as a pigment or extender in paints, plastics, elastomers, soap bars, cosmetic formulations, paper coatings, and other compositions. When used in such applications, it is employed in the particulate form which permits it to serve its desired function, and the particles are typically particles of titanium dioxide prepared by one of the two processes conventionally used for its production, i.e., the sulfate process and the chloride process.

The use of particulate titanium dioxide as a pigment results in a waste of much of the titanium dioxide, since it is only the titanium dioxide at the surface of the particles which serves the pigmentary function. Moreover, the manufacture of titanium dioxide by the sulfate or chloride process creates enough waste to be an environmental concern. It would thus be advantageous to provide a pigment which could serve the functions now served by titanium dioxide particles without requiring the use of as much titanium dioxide.

It is known to use titanium dioxide and/or other pigments with a zeolite, as in U.S. Pat. Nos. 4,220,567 (Kindervater et al.), 4,752,341 (Rock), and 4,874,433 (Kiss et al.); and Domènech et al., "Cyanide photo-oxidation using a $TiO_2$-coated zeolite," *Chem. Ind.*, Vol. 18, page 106, 1989, teach that titanium dioxide employed for a different purpose, i.e., as a photocatalyst, can be supported with 3 Å molecular sieves. However, a method of combining the pigment and zeolite so as to make efficient use of the pigment and/or the pigment source has not previously been available.

SUMMARY OF THE INVENTION

It has been found that coated particles having properties such as to make them suitable as replacements for titanium dioxide particles can be obtained by reacting a titanium or zirconium halide, ether, or ester with zeolite hydrate particles so as to coat the zeolite particles with titania or zirconia.

DETAILED DESCRIPTION

The zeolite hydrate, or zeolite, particles utilized in the practice of the invention may be particles of any natural or synthetic zeolite. Since zeolites are so hygroscopic that they typically contain water of hydration, it is somewhat redundant to refer to them as zeolite hydrates. However, they are sometimes referred to as "hydrates" herein to emphasize their having a water content, since it is their water of hydration that reacts with the titanium reactant to form the titanium dioxide coating.

Thus, the zeolite particles are particles of a crystalline aluminosilicate corresponding to the formula $xM_{2/n}O \cdot Al_2O_3 \cdot ySiO_2 \cdot zH_2O$ in which M is a cation, generally an ammonium or metal cation, most commonly a mono- or divalent metal cation (e.g., a sodium, potassium, or other alkali metal cation, or another cation such as silver, copper, zinc, calcium or magnesium); n is the valence of the cation; x is the coefficient of the metal oxide; y is the coefficient of silica; and z is the number of molecules of water of hydration. They are preferably zeolites having a particle size of 0.1-20 μm (e.g., 2-5 μm) and a $SiO_2/Al_2O_3$ mol ratio ≦14, more preferably a zeolite A, zeolite C, zeolite X, or zeolite Y, most preferably a zeolite A.

From the aspect of cost, the preferred zeolites are the sodium aluminosilicates. However, the calcium and zinc aluminosilicates provide coated zeolites having better pigment efficiency; and the aluminosilicates in which at least a portion of the cations are silver, copper, or zinc cations provide coated zeolites having improved biocidal properties.

The titanium or zirconium compound which is reacted with the zeolite hydrate to form the titania or zirconia coating may be any titanium or zirconium halide, ether, or ester that will undergo such a reaction, e.g., the titanium and zirconium tetrachlorides, tetrabromides, methoxides, ethoxides, propoxides, isopropoxides, butoxides, and oxalates. For economic reasons, the titanium compounds are preferred; and, in most cases, the preferred titanium reactant is titanium tetrachloride—the reactant used in the conventional chloride process for preparing titanium dioxide. However, the use of titanium tetrachloride typically leads to the formation of a coated zeolite containing a small amount of chloride ion unless the product is very thoroughly washed. It is therefore sometimes preferred to employ one of the titanium ethers or esters, e.g., the ethoxide or oxalate, when it is important to avoid contamination of the coated zeolite with even a very small amount of chloride ion.

The amount of titanium compound or zirconium compound utilized in the reaction is such that the titania or zirconia coating formed on the zeolite by its reaction with the water of hydration constitutes 1-50%, preferably 2-30%, of the weight of the titania- or zirconia-coated zeolite produced by the process.

Reaction between the zeolite and the titanium or zirconium reactant can be achieved simply by contacting the reactants. During the course of the reaction, it appears that the titanium or zirconium compound reacts first with the water of hydration which is originally at or near the surface of the zeolite particles and then with water of hydration which has migrated toward the surface from deeper in the pores of the zeolite as the surface water has undergone reaction. Thus, although some of the titania or zirconia can be formed in the pores of the zeolite, it is primarily formed as a coating on the surface of the zeolite particles—preferably a coating which completely covers the surface, including the pores.

Regardless of the particular way in which the reaction is conducted, it is preferably effected in an inert atmosphere, such as nitrogen, to exclude the presence of humid air that could reduce the efficiency of the process by providing a water source other than the zeolite. However, air itself is not harmful to the reaction and, when sufficiently dry, can actually serve as the medium for the reaction.

A particularly convenient method of conducting the reaction is to combine the reactants in a suitable water-immiscible, or substantially water-immiscible, liquid medium. As in other chemical processes, the medium should be inert, at least in the sense of being a compound or mixture of compounds that will permit the desired reaction to be accomplished; and it is generally preferred for the medium to be one or more aliphatic, cycloaliphatic, or aromatic hydrocarbons containing 5-15 carbons, especially heptane. It is important that the medium be anhydrous or substantially anhydrous, since the reaction of the titanium or zirconium compound with any water in the medium reduces the efficiency of the process.

When the reaction is conducted in a liquid medium, it is desirable to (1) add the titanium or zirconium reactant gradually to an agitated slurry of zeolite particles in the medium in order to control the exotherm, (2) continue agitating the slurry until the reaction is complete, (3) recover the resultant $TiO_2$- or $ZrO_2$-coated zeolite by conventional means, e.g., by filtration, washing, and drying, and (4) then pulverize the dried product, if necessary, to achieve the desired particle size. The degree of agitation used in such a process affects the particle size distribution obtained—a broader distribution resulting from the utilization of a low degree of agitation, and a higher degree of agitation resulting in a narrower size distribution.

By-products formed in the slurry reaction can be removed by conventional means, but it is generally preferred to use techniques such as those described hereinafter when the by-product is the HCl that is evolved when a tetrachloride is the titanium or zirconium reactant. Although some of the HCl can be removed by simply allowing it to escape from the reactor, it can be removed more effectively by employing a nitrogen or ammonia stream during the reaction. Alternatively or additionally, an acid scavenger, such as sodium hydroxide, a carbonate, bicarbonate, amine derivative, or other conventional acid scavenger can be included in the reaction mixture to react with the HCl as it is formed. The efficient removal of HCl in either fashion reduces agglomeration and thus permits the formation of a product having a smaller particle size.

When an acid scavenger is employed to react with the HCl another by-product chloride is formed, but this by-product can be removed by a suitable washing step.

It is ordinarily preferred to utilize an ammonia stream and/or an acid scavenger, such as sodium carbonate, to neutralize by-product HCl in the process, regardless of whether the process is conducted in the presence or absence of a liquid medium.

When it is desired to conduct the process without a liquid medium, the titanium or zirconium compound can be added to (1) the zeolite alone; (2) a zeolite which has been moistened with a small amount of an organic liquid, such as one of the hydrocarbons which is useful as the medium in the slurry process; or (3) a zeolite which has been blended with an acid scavenger. The addition of the titanium or zirconium compound is preferably gradual, and agitation is maintained throughout the reaction. After completion of the reaction, the product can be recovered by slurrying it in water, an aqueous solution of an acid scavenger, or other suitable medium and then washing, drying, and pulverizing it.

A coated zeolite prepared by any of the above techniques is easily rehydrated by contact with an aqueous medium or a moist atmosphere, and this characteristic can be beneficial or detrimental—beneficial when it is used in the provision of thicker coatings, and possibly detrimental when no compensation is made for it in the finished product.

When it is desired to provide a thicker coating on a coated zeolite formed by any of the above techniques, the dried or partially-dried coated zeolite is deliberately rehydrated or allowed to rehydrate and is then subjected to another reaction with the titanium or zirconium compound to thicken the titania or zirconia coating. However, when the final coated zeolite has been prepared, it appears that pigment efficiency can be reduced if the coated zeolite is allowed to readsorb water from the atmosphere or from an aqueous medium in which it is subsequently used. Thus, it is desirable to prevent this readsorption when possible, e.g., by keeping the dried product in a dry atmosphere or, more effectively and practically, by heating it at 600°-1100° C. for a suitable time after drying it.

The heat treatment method of preventing readsorption of water—most desirably employed when the pigment is to be used in an application wherein it will not be rewetted, e.g., in oil-based paints, plastics, or elastomers—is most preferably conducted at 800° C. for 1-2 hours. Shorter heating times are required when a higher temperature in the 600°-1100° C. range is employed, and a longer heating period is usually needed when one of the lower temperatures is used.

At least when the coated zeolite is to be used as a pigment in paint, and frequently in other applications, it is usually desirable for the most of the particles to be 0.5-10 $\mu$m in size, as measured by a Microtrac ® particle size analyzer, with at least about 85% of them having a size in the range of 1-7 $\mu$m. However, when the zeolite used to prepare the coated particles is a calcium or zinc zeolite, the product has such increased pigment efficiency that larger particle sizes can also be desirable.

In general, the products of the invention are titania- or zirconia-coated zeolites having a particle size of 0.2-20 $\mu$m, with a mean size preferably $\leq$10 $\mu$m; a $TiO_2$ or $ZrO_2$ content of 1-50%, preferably 2-30%, by weight; and a $TiO_2$ or $ZrO_2$ coating thickness which is preferably 0.001-1, more preferably 0.005-0.2 $\mu$m. These products have various advantages, e.g.:

(1) They have adherent coatings of titania or zirconia rather than the non-adherent "coatings" of Domènech et al., whose products—at least after being contacted with water—have a particle size distribution indicative of a physical mixture of titania and zeolite rather than of a titania-coated zeolite.

(2) They have greater resistance to penetration by water or acid than uncoated zeolites and therefore can be beneficially employed instead of uncoated zeolites in applications wherein there is exposure to water or acid.

(3) They have Hunter reflectance color values which are substantially the same as those for titania or zirconia particles (typically "L" values of 90-95, "a" values between −2 and +2, and "b" values <5), making them suitable as replacements for titania or zirconia particles in pigment applications.

(4) Especially when they contain silver, copper, or zinc cations, they have biocidal activity which can make them useful as ingredients of polymer compositions employed to make containers, pipes, fibers, and films in which such biocidal activity is desired.

(5) They can be used as less expensive replacements for titania or zirconia particles in the many applications in which such particles have been utilized, e.g., as paper fillers, or pigments, and as pigments or extenders in paints, plastics, elastomers, soap bars, cosmetic formulations, paper coatings, and other compositions.

The invention is particularly advantageous in its providing an economical means of preparing titania- or zirconia-coated zeolite particles by a reactive coating process which makes efficient use of a titania or zirconia precursor.

The following examples are given to illustrate the invention and are not intended as a limitation thereof. Unless otherwise specified, quantities mentioned in the examples are quantities by weight.

EXAMPLE I

Charge a suitable reaction vessel with 100 mL of heptane and 10 g of zeolite A containing 20% water of hydration. While maintaining a nitrogen atmosphere and stirring with a ¾ inch (1.9 cm) magnetic bar rotating at 600 rpm, add a blend of 1.7 g of $TiCl_4$ in 10 mL of heptane dropwise at a rate of 5.0 mL/min. Stir the reaction mixture for 30 minutes, vacuum filter, and wash the filter cake three times with 100 mL of petroleum ether, vacuum filtering after each wash. Pulverize the resultant cake, analyze for titanium content and particle size, and test the acid stability and reflectance.

In contrast to the fast-dissolving uncoated zeolite A, the product of this Example dissolves only slowly in acid. It is a $TiO_2$-coated zeolite A having a $TiO_2$ content of 2.3%, particles which are predominantly 1-10 $\mu m$ in size, an average particle size of 3.95 $\mu m$, a Hunter "L" value of 91.63, an "a" value of −0.32, and a "b" value of 1.42.

EXAMPLE II

Charge a suitable reaction vessel with 200 mL of dry heptane and 20 g of the zeolite of Example I. While (1) maintaining a nitrogen atmosphere by continuously adding dry nitrogen through both a compensated addition funnel and a Teflon 0.06 inch (1.6 mm) internal diameter tube extending below the surface of the liquid, (2) stirring with a 1¼ inch (3.2 cm) magnetic bar rotating at 600 rpm, and (3) allowing effluent gas to escape from the reactor through a water-cooled condenser, add a blend of 6.8 g of $TiCl_4$ in 20 mL of dry heptane dropwise at a rate of 5.0 mL/min. Continue stirring the reaction mixture at room temperature for 18 hours while monitoring the pH of the effluent gas, which drops almost immediately upon the addition of $TiCl_4$ to <1.0 and rises to 7.0 by the end of the 18 hours. Vacuum filter the product and wash the filter cake three times with 200 mL of petroleum ether, vacuum filtering after each wash. Dry the coated zeolite in a 60° C. oven overnight and then pulverize and analyze as in Example I.

The product of this example is a $TiO_2$-coated zeolite having a $TiO_2$ content of 3.5%, particles which are predominantly 1-10 $\mu m$ in size, an average particle size of 3.44 $\mu m$, a Hunter "L" value of 93.84, an "a" value of −0.5, and a "b" value of 2.73. Like the product of Example I, it dissolves only slowly in acid.

(For comparative purposes, it should be noted that a commercial $TiO_2$ having an average particle size of 5.53 $\mu m$ has a Hunter "L" value of 94.11, an "a" value of −1.33, and a "b" value of 4.74; and an uncoated zeolite A having an average particle size of 3.55 $\mu m$ has a Hunter "L" value of 93.60, an "a" value of −0.35, and a "b" value of 1.07.)

EXAMPLE III

Charge 280 g of the zeolite A of Example I to a Kitchen Aid mixer enclosed in a plastic nitrogen bag to provide a nitrogen blanket. Add 25.5 g of $TiCl_4$ dropwise over a period of 20 minutes while blending continuously. (A noticeable amount of gaseous material evolves during the $TiCl_4$ addition and shortly afterwards.) Then stir the reaction mixture for two hours, add aqueous sodium carbonate to form a slurry, filter, wash the filter cake with deionized water, dry the washed filter cake in a 75° C. oven for 16 hours, and pulverize the dried sample. The product is a $TiO_2$-coated zeolite having a $TiO_2$ content of 8.4% on an anhydrous basis and a mean particle size of 4.7 $\mu m$.

EXAMPLE IV

Using the same equipment as in Example III, blend 34 g of triethylamine with 250 g of the zeolite of Example I and then add 42.5 g of $TiCl_4$ dropwise while blending. A substantial heat kick is noted during the $TiCl_4$ addition and shortly afterwards. Add water to form a slurry, filter, and wash, dry, and pulverize as in Example III. The product is a $TiO_2$-coated zeolite having a $TiO_2$ content of 8.2% and a mean particle size of 7.1 $\mu m$. When Hunter reflectance measurements are made on an oil immersion of the pigment as a screening procedure to determine pigment efficiency, it is found that a 10% oil immersion of the product has a Hunter "L" value of 80.5, compared with a Hunter "L" value of only 39 for a 10% oil immersion of an uncoated zeolite having a mean particle size of 3.0 $\mu m$.

EXAMPLE V

Essentially repeat Example IV except for using 255 g of the zeolite and blending it with 25.5 g of heptane instead of with triethylamine. Also, after drying the product, heat it to 800° C. for one hour to complete removal of the moisture. The product is a $TiO_2$-coated zeolite having a $TiO_2$ content of 10.3% and a mean particle size of 4.95 $\mu m$. A 10% oil immersion of the product has a Hunter "L" value of 80.

EXAMPLE VI

Prepare four $TiO_2$-coated zeolites—two from Na zeolite A, one from Zn zeolite A, and one from Ca zeolite A. Then test the pigment efficiencies of each of the coated zeolites and an uncoated zeolite A in 5% oil immersions. The results are shown below, the particle sizes given being mean particle sizes.

| Zeolite A | % $TiO_2$ | Particle Size ($\mu m$) | Hunter "L" Value |
| --- | --- | --- | --- |
| Na | 0 | 2.8 | 26 |
| Na | 8 | 4.7 | 56 |
| Na | 15.3 | 7.3 | 62 |
| Ca | 9 | 6.7 | 69 |
| Zn | 13.8 | 11.5 | 73 |

EXAMPLE VII

Part A

Prepare four $TiO_2$-coated zeolites having $TiO_2$ contents of 4%, 8%, 16%, and 19% from Na zeolite A, and place each of the coated zeolites in a humidity chamber kept at 80% humidity in ambient temperature. Take a sample of each of the coated zeolites, blend it with mineral oil to form a 5% oil immersion, and determine the Hunter "L" values of the immersions. The values determined are shown below.

| % TiO$_2$ | Hunter "L" Value |
|---|---|
| 4 | 54 |
| 8 | 65 |
| 16 | 70 |
| 19 | 72 |

Take another sample of each of the coated zeolites or Part A and dry it at 105° C. overnight before using it to prepare a 5% oil immersion. The amounts of water lost in drying and the Hunter "L" values of the oil immersions are shown below.

| % TiO$_2$ | % H$_2$O Lost | Hunter "L" Value |
|---|---|---|
| 4 | 14 | 61 |
| 8 | 14 | 69 |
| 16 | 14 | 72 |
| 19 | 15 | 74 |

Take another sample of each of the coated zeolites of Part A, dry it at 105° C. as in Part B, but then place it back in the humidity chamber to rehumidify it before using it to prepare a 5% oil immersion. The amounts of water gained by the humidification and the Hunter "L" values of the oil immersions are shown below.

| % TiO$_2$ | % H$_2$O Gained | Hunter "L" Value |
|---|---|---|
| 4 | 16 | 54 |
| 8 | 12 | 66 |
| 16 | 14 | 51 |
| 19 | 7 | 74 |

Take another sample of each of the coated zeolites of Part A, dry and rehumidify it as in Part C, but then heat it at 800° C. for one hour before using it to prepare a 5% oil immersion. The amounts of water lost in the heat treatment and the Hunter "L" values of the oil immersions are shown below.

| % TiO$_2$ | % H$_2$O Lost | Hunter "L" Value |
|---|---|---|
| 4 | 20 | 65 |
| 8 | 20 | 70 |
| 16 | 21 | 73 |
| 19 | 18 | 75 |

Take another sample of each of the coated zeolites of Part A; dry, rehumidify, and heat treat it as in Part D; and then place it back in the humidity chamber for rehumidification. The amounts of water gained in this rehumidification are shown below.

| % TiO$_2$ | % H$_2$O Gained |
|---|---|
| 4 | 0.4 |
| 8 | 0.3 |
| 16 | 0 |
| 19 | 0.6 |

As demonstrated in the preceding example, a TiO$_2$-coated zeolite which has been dried at 105° C. readsorbs the water it has lost when it is exposed to humidifying conditions, while a heat treatment at 800° C. appears to make the dehydration permanent.

What is claimed is:

1. A process which comprises contacting zeolite particles with a titanium or zirconium compound selected from the group consisting of halides, ethers, and esters in an anhydrous or substantially anhydrous inert medium so as to react said compound with the water of hydration of the zeolite and form a titania or zirconia coating on the particles.

2. The process of claim 1 conducted in a hydrocarbon slurry.

3. The process of claim 1 wherein the titanium or zirconium compound is a halide.

4. The process of claim 3 conducted in the presence of an ammonia stream and/or an acid scavenger.

5. The process of claim 4 wherein the halide is titanium tetrachloride.

6. The process of claim 1 wherein the titanium or zirconium compound is an ether.

7. The process of claim 6 wherein the ether is titanium ethoxide.

8. The process of claim 1 wherein the titanium or zirconium compound is an ester.

9. The process of claim 8 wherein the ester is titanium oxalate.

10. The process of claim 1 wherein the coated zeolite particles formed by the reaction are treated by (a) recovering them from the reaction mixture, if necessary, (b) washing, and (c) drying them.

11. The process of claim 10 wherein the washed coated particles are completely dried and then pulverized so that they have a particle size of 0.5–10 μm.

12. The process of claim 11 wherein the pulverized particles are heated at 600°–1100° C. to stabilize them against readsorption of water.

13. The process of claim 12 wherein the particles are heated at 800° C.

14. The process of claim 10 wherein the washed coated particles are partially dried, rehydrated, and contacted with an additional amount of said titanium or zirconium compound in an inert medium so as to thicken said titania or zirconia coating on the particles.

15. The process of claim 14 wherein the coated zeolite particles formed by the reaction are treated by (a) recovering them from the reaction mixture, if necessary, (b) washing, (c) drying and (d) pulverizing them so that they have a particle size of 0.5–10 μm.

16. The process of claim 15 wherein the pulverized particles are heated at 600°–1100° C. to stabilize them against readsorption of water.

17. The process of claim 16 wherein the particles are heated at 800° C.

* * * * *